(12) United States Patent
Xu et al.

(10) Patent No.: US 12,498,690 B2
(45) Date of Patent: *Dec. 16, 2025

(54) SYSTEM AND METHOD FOR CONFIGURATION OF MACRO COMMANDS IN A CONTROLLING DEVICE

(71) Applicant: Universal Electronics Inc., Scottsdale, AZ (US)

(72) Inventors: Rex Xu, Tustin, CA (US); Cesar Alvarado, Orange, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,858

(22) Filed: Dec. 3, 2021

(65) Prior Publication Data

US 2022/0091573 A1 Mar. 24, 2022

Related U.S. Application Data

(63) Continuation of application No. 16/940,532, filed on Jul. 28, 2020, now Pat. No. 11,237,536, which is a
(Continued)

(51) Int. Cl.
*G05B 19/042* (2006.01)
*G08C 19/28* (2006.01)

(52) U.S. Cl.
CPC ......... *G05B 19/0426* (2013.01); *G08C 19/28* (2013.01); *G05B 2219/23077* (2013.01);
(Continued)

(58) Field of Classification Search
CPC .................................................. G05B 19/0426
(Continued)

(56) References Cited

U.S. PATENT DOCUMENTS 4,959,810 A 9/1990 Darbee et al.
5,614,906 A 3/1997 Hayes et al.
(Continued)

OTHER PUBLICATIONS

Sony KDL-32L4000 Operating Instructions, p. 1-44, Sony Corp., release date Mar. 2, 2008, downloaded from http://www.sony.com/electronics/support/televisions-projectors-lcd-tvs/kdl-3214000/manuals on Jul. 31, 2023.*
(Continued)

*Primary Examiner* — Ruay Ho
(74) *Attorney, Agent, or Firm* — Greenberg Traurig, LLP

(57) ABSTRACT

A system displays a representation of an original equipment remote control device for a target device to be controlled using a macro button of a configurable controlling device. The displayed representation of the original equipment remote control device includes representations of buttons that would be used on the original equipment remote control device to control controllable functions of the target device. The system accepts input by which one or more of the displayed representations of buttons are selected. The macro button is then configured whereby an activation of the macro button will cause a transmission of commands from the configurable controlling device to control those controllable functions of the target devices that correspond to the one or more of the displayed representations of buttons that were selected.

14 Claims, 8 Drawing Sheets

Related U.S. Application Data continuation of application No. 16/378,083, filed on Apr. 8, 2019, now Pat. No. 10,768,599, which is a continuation of application No. 12/491,688, filed on Jun. 25, 2009, now Pat. No. 10,281,893.

(52) U.S. Cl.
CPC ..... *G08C 2201/21* (2013.01); *G08C 2201/30* (2013.01); *G08C 2201/33* (2013.01); *G08C 2201/92* (2013.01)

(58) Field of Classification Search
USPC ........ 715/704; 438/485; 348/14.05; 341/176
See application file for complete search history.

(56) References Cited

U.S. PATENT DOCUMENTS

| | | | |
|---|---|---|---|
| 6,008,735 A | 12/1999 | Chiloyan et al. | |
| 6,225,938 B1 | 5/2001 | Hayes et al. | |
| 6,640,144 B1 | 10/2003 | Huang et al. | |
| 8,161,172 B2 | 4/2012 | Reisman | |
| 9,071,329 B2 | 6/2015 | Escobosa | |
| 2001/0033243 A1 | 10/2001 | Harris et al. | |
| 2003/0234737 A1 | 12/2003 | Nelson et al. | |
| 2004/0056789 A1 | 3/2004 | Arling et al. | |
| 2004/0113892 A1 | 6/2004 | Mears | |
| 2004/0257259 A1 | 12/2004 | Jindal | |
| 2005/0020038 A1* | 1/2005 | Mikhael | H05H 1/2431 |
| | | | 438/485 |
| 2005/0220038 A1 | 10/2005 | Muto et al. | |
| 2006/0050142 A1* | 3/2006 | Scott | G08C 23/04 |
| | | | 348/14.05 |
| 2010/0156694 A1* | 6/2010 | Rye | G08C 17/02 |
| | | | 341/176 |

OTHER PUBLICATIONS

Sony KDL-32L4000 Operating Instructions, p. 21-22, Sony Corp., release date Mar. 2, 2008, downloaded from http://www.sony.com/electronics/support/televisions-projectors-lcd-tvs/kdl-3214000/manuals on Jul. 31, 2023.*
European Patent Office, examination report issued on European patent application No. 10792479.7, dated Nov. 28, 2016, 7 pages.
European Patent Office, extended European search report issued on European patent application No. 10792479.7, 8 pages.
The International Bureau of WIPO, International Preliminary Report on Patentability of PCT Application No. US2010/31841, dated Jan. 4, 2012, 6 pages.

* cited by examiner

SYSTEM AND METHOD FOR CONFIGURATION OF MACRO COMMANDS IN A CONTROLLING DEVICE

RELATED APPLICATION INFORMATION

This application claims the benefit of and is a continuation of U.S. application Ser. No. 16/940,532, filed on Jul. 28, 2020, which application claims the benefit of and is a continuation of U.S. application Ser. No. 16/378,083, filed on Apr. 8, 2019, which application claims the benefit of and is a continuation of U.S. application Ser. No. 12/491,688, filed on Jun. 25, 2009, the disclosures of which are incorporated herein by reference in their entirety.

BACKGROUND

This invention relates generally to controlling devices, such as for example universal remote controls, and more specifically to systems and methods for configuration of such controlling devices, by way of general example, to match such controlling devices to appliances to be controlled, to define favorite channels, etc., and more specifically to provide for the programming of macro command sequences for use in such controlling devices.

As is known in the art, in order to match a controlling device with an appliance to be controlled, data may be provided to the controlling device that serves to identify an intended target appliance by its type and make (and sometimes model). Such data may allow the controlling device to identify appropriate command data within a library of command data that is pre-stored in or downloaded to the controlling device, and to transmit recognizable commands in a format appropriate for such identified appliances. Multiple methods for providing such setup data have been proposed, including the setup procedures described, for example, in U.S. Pat. Nos. 4,959,810, 5,614,906, and 6,225,938, which describe self-contained setup of controlling devices, or published U.S. Patent Application No. 2001/0033243A1 which describes setup of controlling devices by interaction with a Web site. Still further, it will be understood that a controlling device may be configurable to provide rapid access to favorite channels, to designate that certain control functions (e.g., volume control) be always directed to specific devices (e.g., television), and in particular, may be configurable to execute user defined sequences of commands in response to a single keypress or icon activation (a so-called "macro" function).

While these variously known systems and methods for configuring a controlling device generally work for their intended purpose, a need remains for a system and method that provides a yet more convenient and user friendly way for configuring a controlling device and, in particular, macro command sequences for use therein.

SUMMARY OF THE INVENTION

In accordance with this and other needs, the following generally describes a system and method to facilitate configuration of a controlling device. To this end, in addition to one or more of the previously described configuration methods, a means is provided by which users may easily create macro command sequences by using images of the original equipment remote controls normally provided with target appliances. By way of example, once intended target appliances have been identified to a controlling device or other device used in the configuration process (using any of the methods mentioned above), an interactive macro configuration application may be invoked which displays images representative of original equipment remote control devices corresponding to the identified target devices whereupon a user may select from the remote control keys depicted in those images commands to be used in a macro command sequence. In this manner, users of a configurable controlling device may be provided with the ability to rapidly and conveniently create macro command sequences by using images of the original equipment remote controls with which they are already familiar.

It will be appreciated that such an interactive macro command configuration application may be resident on a personal computer (PC), a set top box, a network gateway, etc., or even on the controlling device itself in cases where the controlling device includes display and processing capability sufficient to support such an application.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
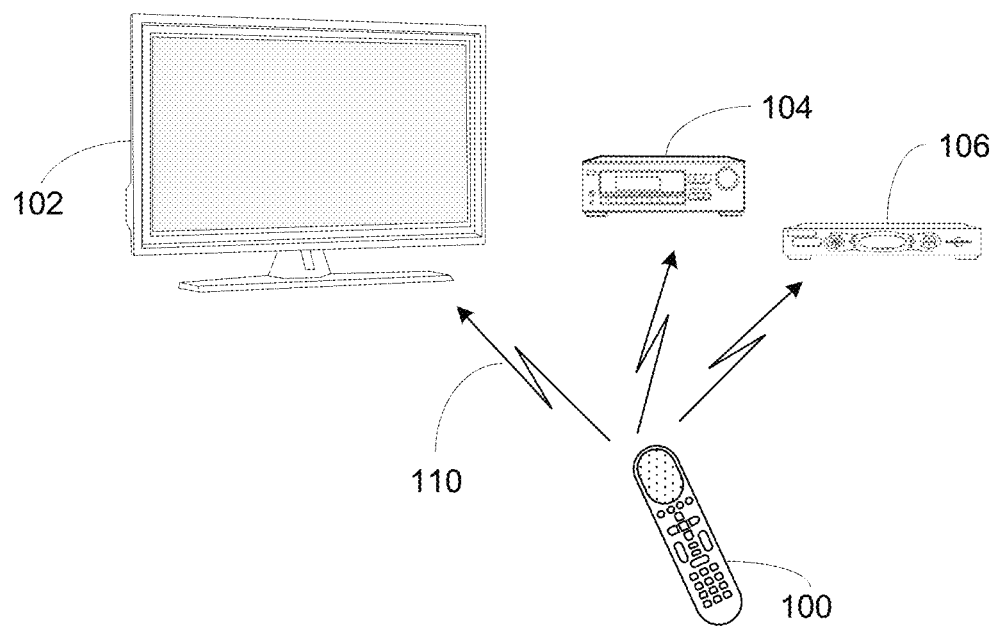
FIG. 1 illustrates a system in which an exemplary controlling device is configured to issue operational commands to exemplary controlled appliances according to the principles of the instant invention.

The following describes a system and method by means of which a controlling device, such as a universal remote control, may be configured to command the operation of one or more consumer electronic appliances. By way of example, FIG. 1 illustrates an exemplary system wherein a controlling device 100 may be used to command functions of various appliances such as a television 102, an AV receiver 104, a cable or satellite set top box 106, etc. In the embodiment illustrated, controlling device 100 communicates with other controlled devices 102, 104, 106 via a unidirectional infrared (IR) link 110, however, as is known in the art, controlling device 100 may be capable of communicating with these appliances using any convenient IR, RF, point-to-point, or networked protocol to cause the appliances to perform operational functions, provided the control protocols and command values to be used in communicating with a desired target appliance are known to the operational software of controlling device 100.

Figure 2:
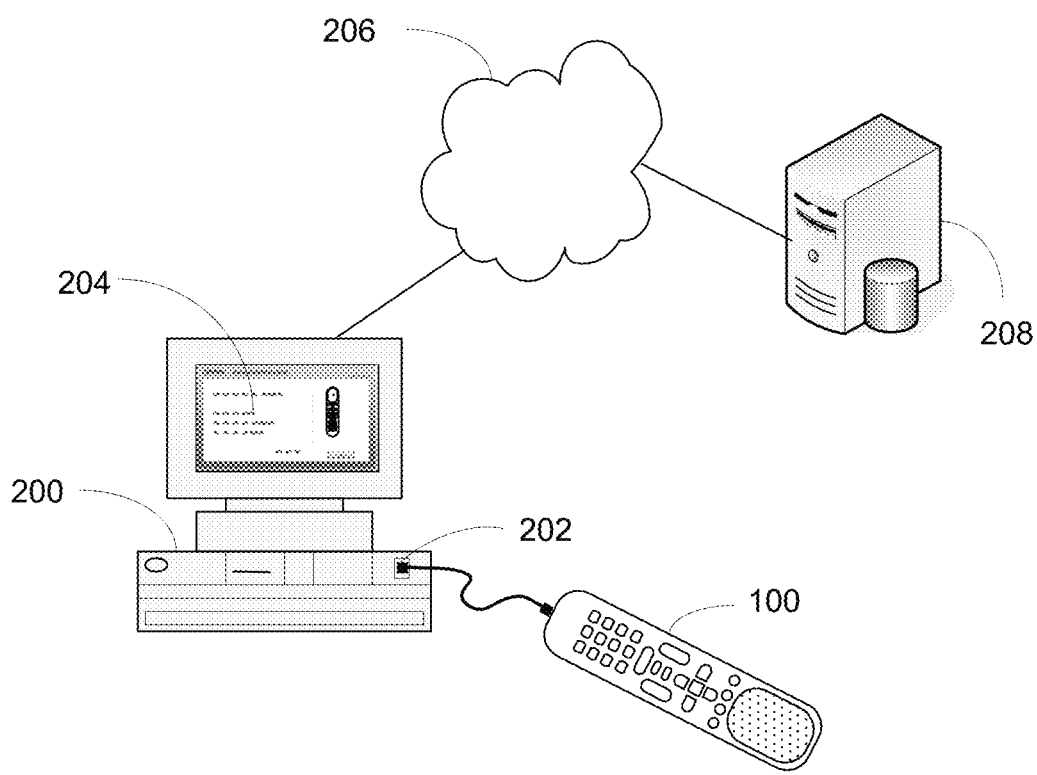
FIG. 2 illustrates a system wherein the exemplary controlling device of FIG. 1 is placed into communication with a personal computer for the purpose of configuring macro command sequences of the controlling device.

In an exemplary embodiment illustrated in FIG. 2, controlling device 100 may also be periodically placed into communication with another device, such as a personal computer 200, via a suitable wired or wireless connection, such as via a USB connection 202, in order to initiate or perfect the configuration of controlling device 100. To this end, a configuration application may be executed by PC 200 to upload configuration data from controlling device 100, to provide a user interface 204 for display and selection of configuration options, and to download resulting new and/or modified configuration data to controlling device 100. The creation of such new or modified configuration data may include the use of data stored locally on PC 200 and/or data stored on a server 208 and accessed via a wide area communication network 206 such as the Internet. As is known in the art, the configuration application executed on PC 200 may, without limitation, take the form of a local application, a JAVA applet, HTML, statements, ActiveX controls, etc., or any combination thereof as appropriate. Further, all or parts of the various steps performed in the processes involved in generating a controlling device configuration may be performed by the controlling device 100, by PC 200, and/or by a Web service hosted at a local or distant server 208 which may be accessed directly or via an intermediate device such as PC 200, without limitation.

While illustrated in the context of a television 102, an A/V receiver 104 and a set top box 106, it is to be understood that controllable appliances may include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. It will also be appreciated that, while in the illustrative embodiment a PC 200 is utilized to support the configuration application for controlling device 100, in alternative embodiments this function may be performed equally well by any other appliance such as, for example, a set top box, or even controlling device 100 itself. Further, while the illustrative coupling of controlling device 100 to the configuring appliance is via a wired interface 202, it will be appreciated that in alternative embodiments other coupling means may be employed with equal success, for example wireless connections such as WiFi, Bluetooth, infrared transmission, etc.

Figure 3:
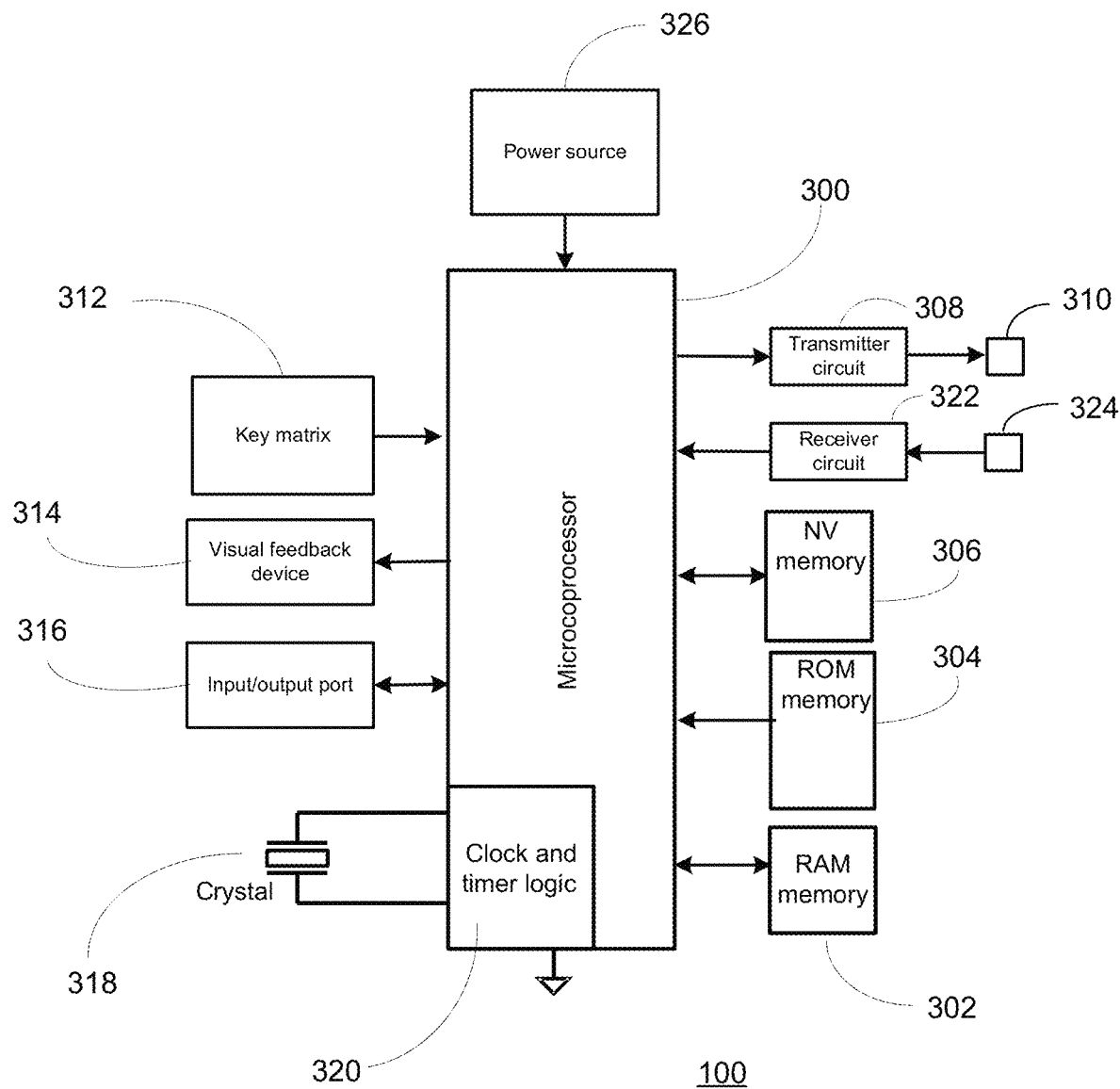
FIG. 3 illustrates a block diagram of exemplary components of the exemplary controlling device of FIG. 1.

With reference to FIG. 3, for use in commanding the functional operations of one or more appliances, controlling device 100 may include, as needed for a particular application, a processor 300 coupled to a ROM memory 304, a RAM memory 302, a key matrix 312 (e.g., hard keys, soft keys such as a touch sensitive surface overlaid on a liquid crystal (LCD) or an electroluminescent (EL) display, or some combination thereof), a transmission circuit 308 and associated IR and/or RF emitter 310, a non-volatile read/write memory 306, a means 314 to provide feedback to the user (e.g., one or more visible LEDs, LCD display, speaker, backlighting, and/or the like), a power source 326, an input/output port 316 such as a serial interface, modem, USB port, etc., and clock and timer logic 320 with associated crystal or resonator 318.

As will be understood by those skilled in the art, some or all of the memories 302, 304, 306 may include executable instructions (collectively, the program memory) that are intended to be executed by the processor 300 to control the operation of the remote control 100, as well as data that serves to define the aforementioned control protocols and command values to the operational software (collectively, the command data). In this manner, the processor 300 may be programmed to control the various electronic components within the remote control 100, e.g., to monitor the power supply 310, to cause the transmission and reception of signals, control visual feedback device(s) 314, etc. All or part of the non-volatile read/write memory 306, for example an EEPROM, battery-backed up RAM, FLASH, Smart Card, memory stick, or the like, may additionally be used to store setup data and parameters as necessary. While the memory 304 is illustrated and described as a ROM memory, memory 304 may also be comprised of any type of readable media, such as ROM, FLASH, EEPROM, or the like. Preferably, the memories 304 and 306 are non-volatile or battery-backed such that data is not required to be reloaded after battery changes. In addition, the memories 302, 304, and 306 may take the form of a chip, a hard disk, a magnetic disk, an optical disk, and/or the like. Still further, it will be appreciated that some or all of the illustrated memory devices may be physically incorporated within the same IC chip as the microprocessor 300 (a so called "microcontroller") and, as such, they are shown separately in FIG. 3 only for the sake of clarity.

To cause the controlling device 100 to perform an action, controlling device 100 may be adapted to be responsive to events, such as a sensed user interaction with the key matrix 312, etc. In response to an event, appropriate instructions within the program memory (hereafter the "operating program") may be executed. For example, when a function key is actuated on the controlling device 100, the controlling device 100 may retrieve from the command data stored in memory 302, 304, and/or 306 the command value and control protocol currently assigned to the actuated function key and the currently assigned device mode to thereby transmit a command to an intended target appliance, e.g., the STB 106 or the TV 102, in a format recognizable by the intended target appliance. It will also be appreciated that the operating program can be used not only to cause the transmission of command codes and/or data to the appliances, but also to perform local operations. While not limiting, local operations that may be performed by the controlling device 100 may include displaying information/data, favorite channel selection, macro sequence execution, function key relocation, etc. Examples of local operations can be found in U.S. Pat. Nos. 5,481,256, 5,959,751, and 6,014,092.

Figure 4:
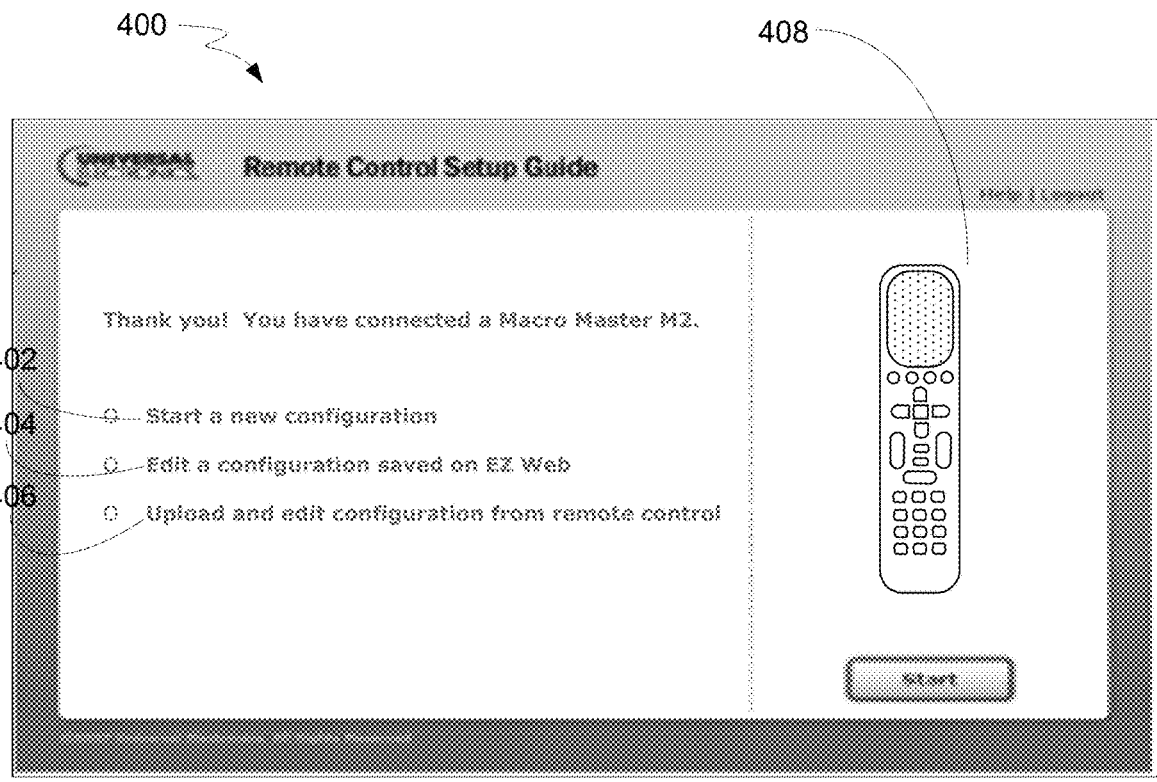
FIG. 4 illustrates portions of an exemplary user interface which may be invoked upon the controlling device of FIG. 1 being placed into communication with a personal computer as illustrated in FIG. 2.

With reference to FIG. 2, upon detection by PC 200 that a controlling device 100 has been placed in communication therewith, a configuration application 204 may be automatically invoked as is well known in, for example, the USB art. Configuration application 204 may commence with a screen display 400 as illustrated in FIG. 4 which includes an image 408 of the controlling device just connected—by way of confirmation to a user that the type and model of their controlling device has been correctly identified by configuration application 204—together with a selection of possible actions to be performed 402, 404, 406. The options presented may include an option 402 to start an entirely new configuration, an option 404 to edit an existing configuration previously stored by configuration application 204, and an option 406 to upload and store the current configuration of controlling device 100. In this regard, it will be appreciated that in various embodiments such configurations may be stored locally on PC 200, remotely on server 208, or a combination thereof, as appropriate. It will also be appreciated that in certain embodiments the ability to select one of multiple stored configurations may be offered. Further, the list of possible actions presented to the user may vary depending upon the respective status of the controlling device's current configuration and that of the currently stored configuration(s)

Figure 5:
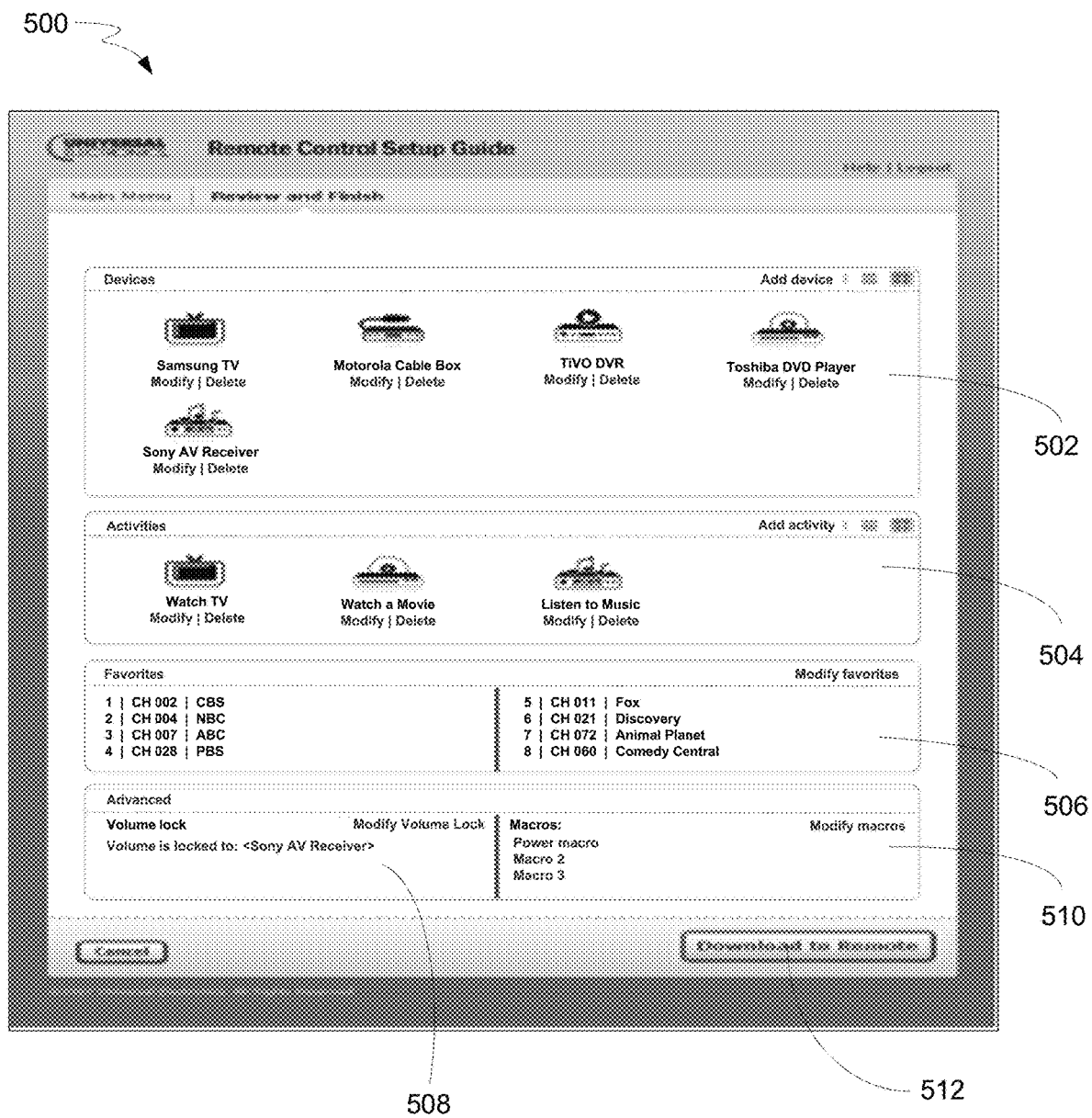
FIG. 5 illustrates an exemplary user interface comprising a menu of user-selectable options for editing the configuration of the exemplary controlling device of FIG. 1.

With reference to FIG. 5, once controlling device 100 has been connected and a desired configuration to be created or modified selected as described above, an exemplary main menu of configuration editing options 500 may be presented to the user. These may include option 502 to allow a user to add, modify, or delete devices that are to be controlled using controlling device 100; option 504 to allow a user to add, modify, or delete activities commandable using controlling device 100; option 506 to allow a user to add, modify, or delete favorites keys of the controlling device (e.g., keys that, when actuated, provide quick access to favorite channels); option 508 to allow a user to configure special options of the controlling device 100 (such as locking the volume keys to a particular target device); and/or option 510 to allow a user to create, modify, or delete macro command sequences. In the illustrative embodiment, upon completion of all desired editing activity, user selection of icon 512 labeled "Download to Remote," may result in the loading of the updated configuration data into a connected controlling device 100. It will be appreciated that the controlling device need not be connected to the computing device throughout the configuration editing process. Rather, the controlling device need be placed into communication with the computing device only during times when it is desired to upload data from the controlling device to the computing device or when it is desired to download a created/edited configuration from the computing device to the controlling device.

Figure 6:
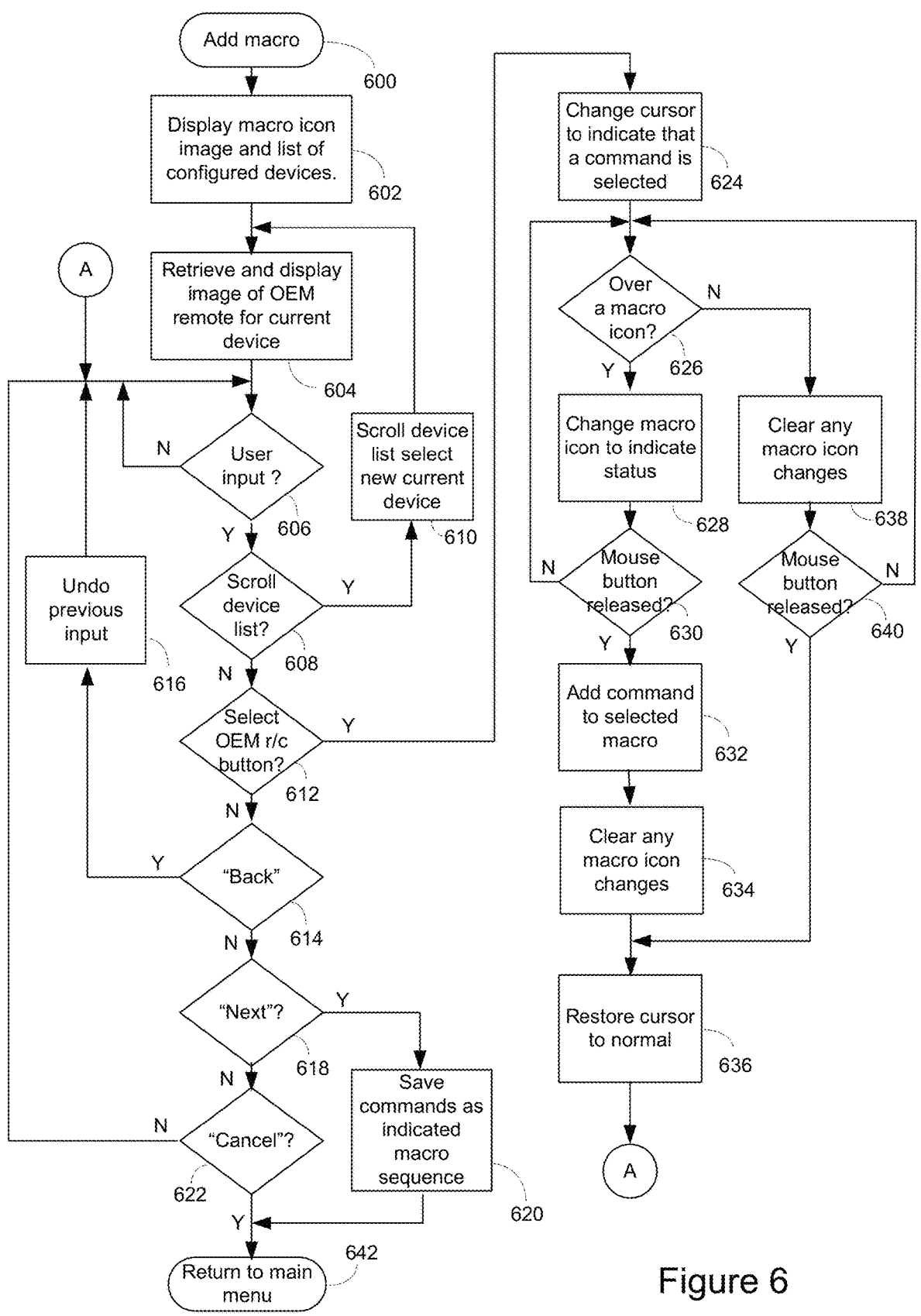
FIG. 6 illustrates in flow chart form an exemplary method for defining macro command sequences for use in the exemplary controlling device of FIG. 1.
Figure 7:
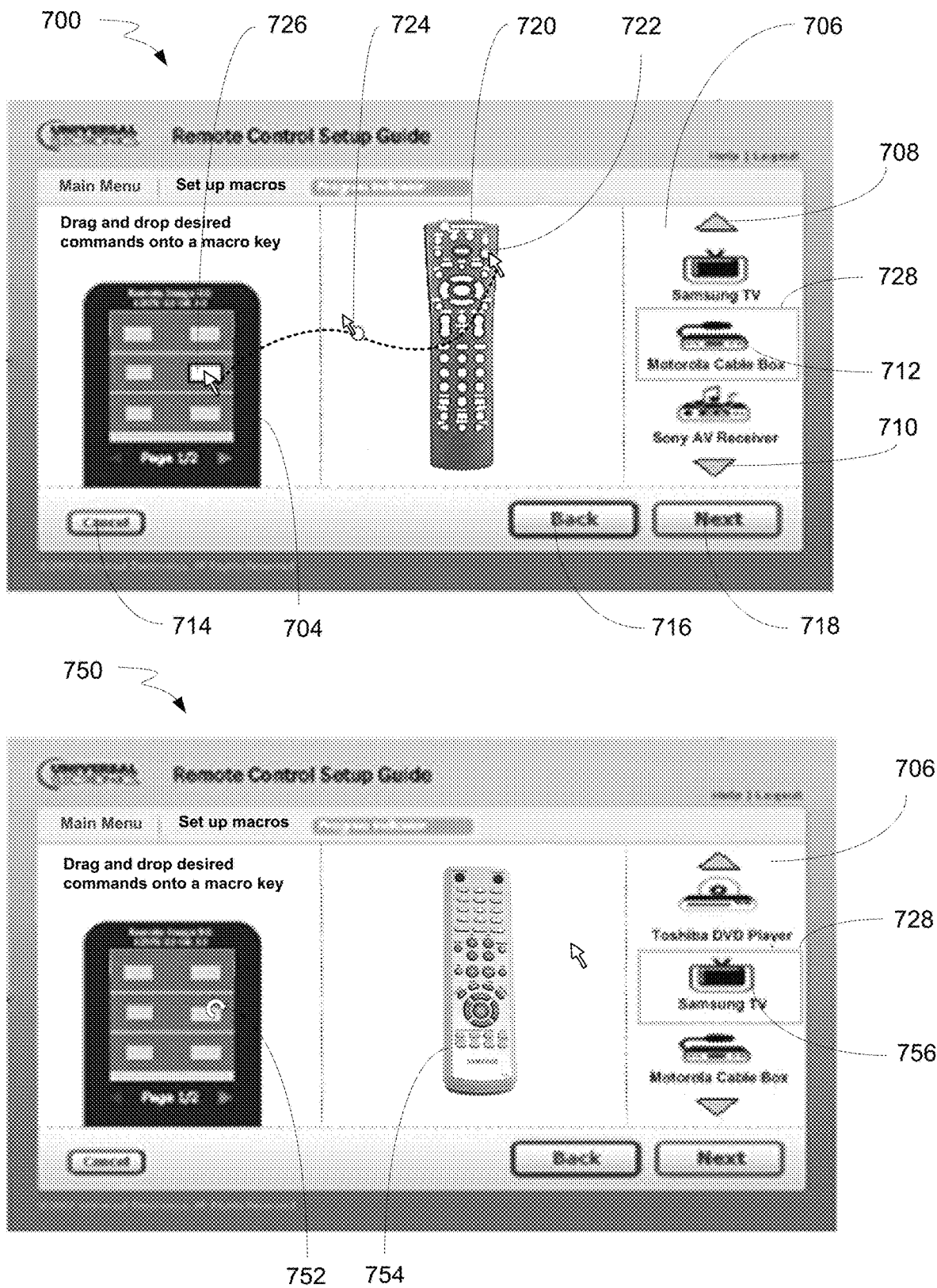
FIG. 7 illustrates portions of an exemplary user interface used in conjunction with the method illustrated in FIG. 6.

An exemplary method for configuring macro command sequences using a PC based configuration application is presented in flowchart form in FIG. 6 which utilizes, for example, an exemplary PC screen user interface shown in FIG. 7. Such a method may be initiated, for example, by user selection of the "modify macros" option 510 of FIG. 5, though it will be appreciated that other configurable options such as favorite channel selection 506 or activity initiation 504 may themselves incorporate command sequences and may thus be configurable in a similar manner. Commencing at step 600, an exemplary configuration application user interface 700 may display an image 704 of one ore more macro command icons (or buttons, as appropriate) available on controlling device 100, together with a listing 706 of configured target appliances. The display of the macro command icons may include a display of the icons alone (individually or collectively) and/or a display of the icons with all or part of controlling device 100 as illustrated in FIG. 7. If the list of target appliances is longer than can be displayed in the space available, clickable icons 708,710 may be provided to allow a user to scroll through a listing of appliances. In certain embodiments, scrolling icons 708, 710 may also be used to select a current appliance as described below. The currently selected target appliance 712 may be presented in a window 728, highlighted, magnified, or otherwise emphasized for user convenience. Next, at step 604 an image 720 of the original equipment remote control for the currently selected device 712 is retrieved and displayed. Retrieval of image 720 may be from local storage on PC 200, from a distant server 208 via a network 206, or a combination thereof. It will also be appreciated that in instances where exact image data is not available for the particular OEM remote control associated with the currently selected configured target device, a closest match image, a generic image, a drop-down list of available command function names, etc. may be substituted as necessary. At step 606 the configuration application then waits for user input. In the exemplary embodiment that is illustrated such input may be by means of a mouse-controlled cursor as is well known in the art, however it will be appreciated that other input means may be employed as appropriate for alternate embodiments.

If received user input is determined at step 608 to be activation of a scroll icon 708,710 then at step 610 the configured target appliance list is scrolled up or down as indicated. In one embodiment, the appliance centered in a fixed area, e.g., window 728, may represent the currently selected appliance, i.e., the scrolling activity may result in the selection of a new appliance as illustrated for example by icon 756 being moved into area 728 as shown in further exemplary screen display 750. In this case, upon completion of scrolling activity processing may resume at step 604 to retrieve and display an image of the original equipment remote control applicable to the newly selected device, for example remote control 754 corresponding to appliance 756.

If received user input is determined at step 614 to be activation of "back" icon 716, any previous user input action is undone at step 616 and thereafter the configuration application awaits further user input at step 606.

If received user input is determined at step 618 to be activation of "next" icon 718, the macro command sequence (s) tabulated during the present programming session are saved into the controlling device configuration being edited and at step 642 the configuration application returns to main menu display 500.

If received user input is determined at step 622 to be activation of "Cancel" icon 714 the configuration application returns to main menu display 500 without saving any current changes to any macro command sequence(s).

If received user input is determined at step 612 to be activation of one of the buttons of displayed OEM remote control image, for example button 722 of image 720, then at step 624 the screen cursor may be changed to indicate to the user that a command function has been selected, for example as illustrated at 724, and may now be dragged and dropped onto one of the displayed representations of macro command icons available on controlling device 100, e.g., icon 726. To achieve this functionality, at step 626 the configuration application first determines if the cursor is currently hovering over a displayed representation of an eligible macro command icon. If not, at step 638 any changes to the display 704 are cleared (the nature and purpose of such changes will be described in further detail hereafter) and at step 640 it is next determined if the mouse button has been released. If not, the drag operation remains active and processing continues at step 626. If the mouse button has been released, the drag operation is aborted, and at step 636 the cursor display is returned to its normal state after which the configuration application returns to step 606 to await further user input.

If, however, it is determined at step 626 that the cursor is currently hovering over a displayed representation of an eligible macro icon, then at step 628 the macro icon representation may be altered to indicate this state to the user, for example emphasized as illustrated at 726, magnified, made blinking, colored changed, etc. In this context, it will be appreciated that in some embodiments, not every macro icon displayed may be eligible or may remain eligible for programming, for example embodiments where certain macro icons may be pre-assigned for specific uses such as "all power on", or where a limit to the number of commands that may be programmed as a single macro sequence has been reached, etc. Next, at step 630 the configuration application determines if the mouse button has been released (i.e., a "drop" operation is being performed as is well known in the art). If not, drag functionality is still active and processing returns to step 626. If the mouse button has been released, at step 632 the command function selected from the displayed image 720 of the original equipment remote control is registered into a macro command sequence for the macro icon. At step 634, the changes made to the macro icon representation at step 628 are removed. In certain embodiments, the displayed representation of the macro icon may be further modified to indicate that it now has command function(s) programmed onto it, for example via an overlay as illustrated at 752, a color change, etc. It will be appreciated that, in this illustrated embodiment, multiple macro icons (if available) can each be programmed with macro command sequences during a current editing session.

Figure 8:
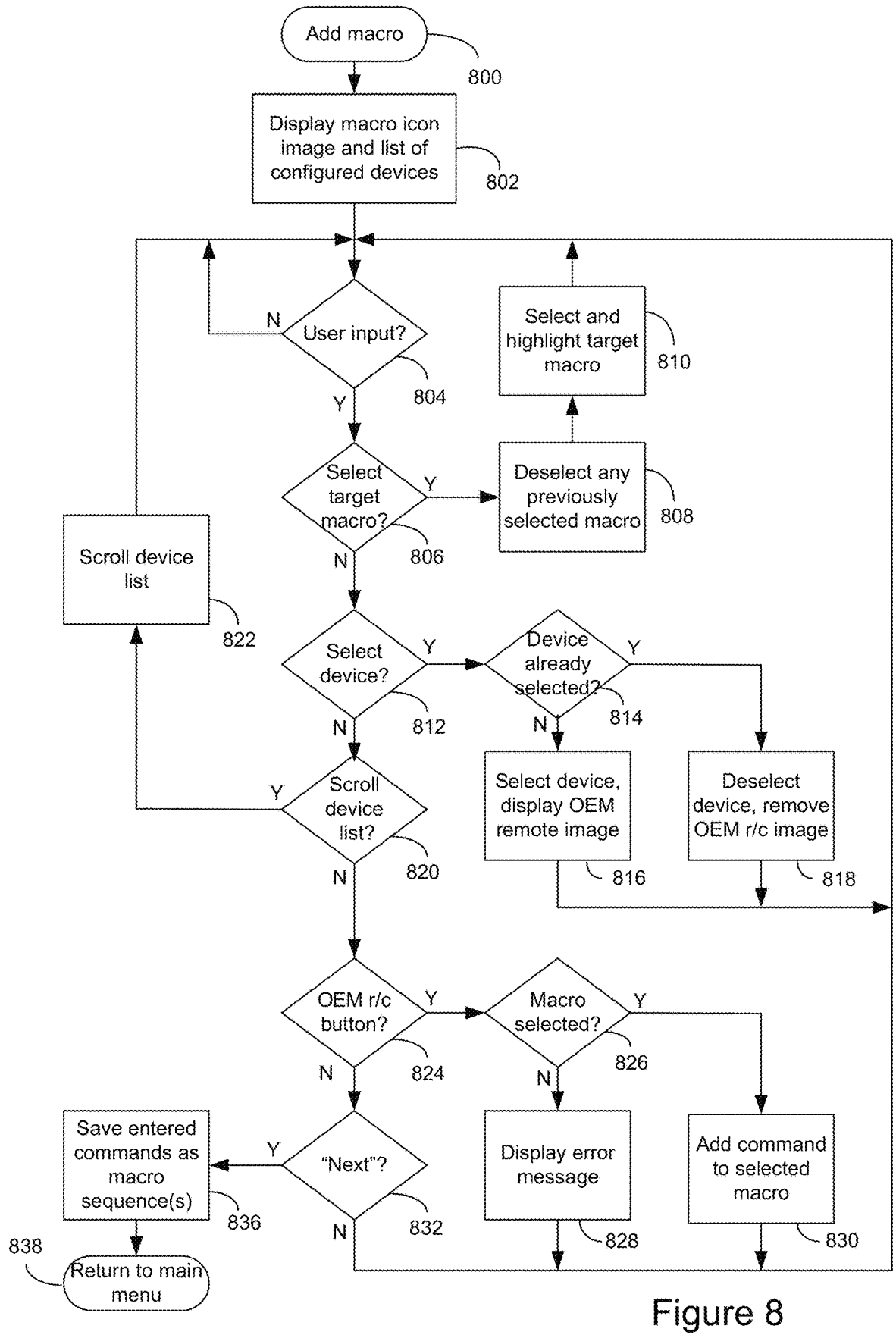
FIG. 8 illustrates in flow chart form a second exemplary method for defining macro command sequences for use in the exemplary controlling device of FIG. 1.
Figure 9:
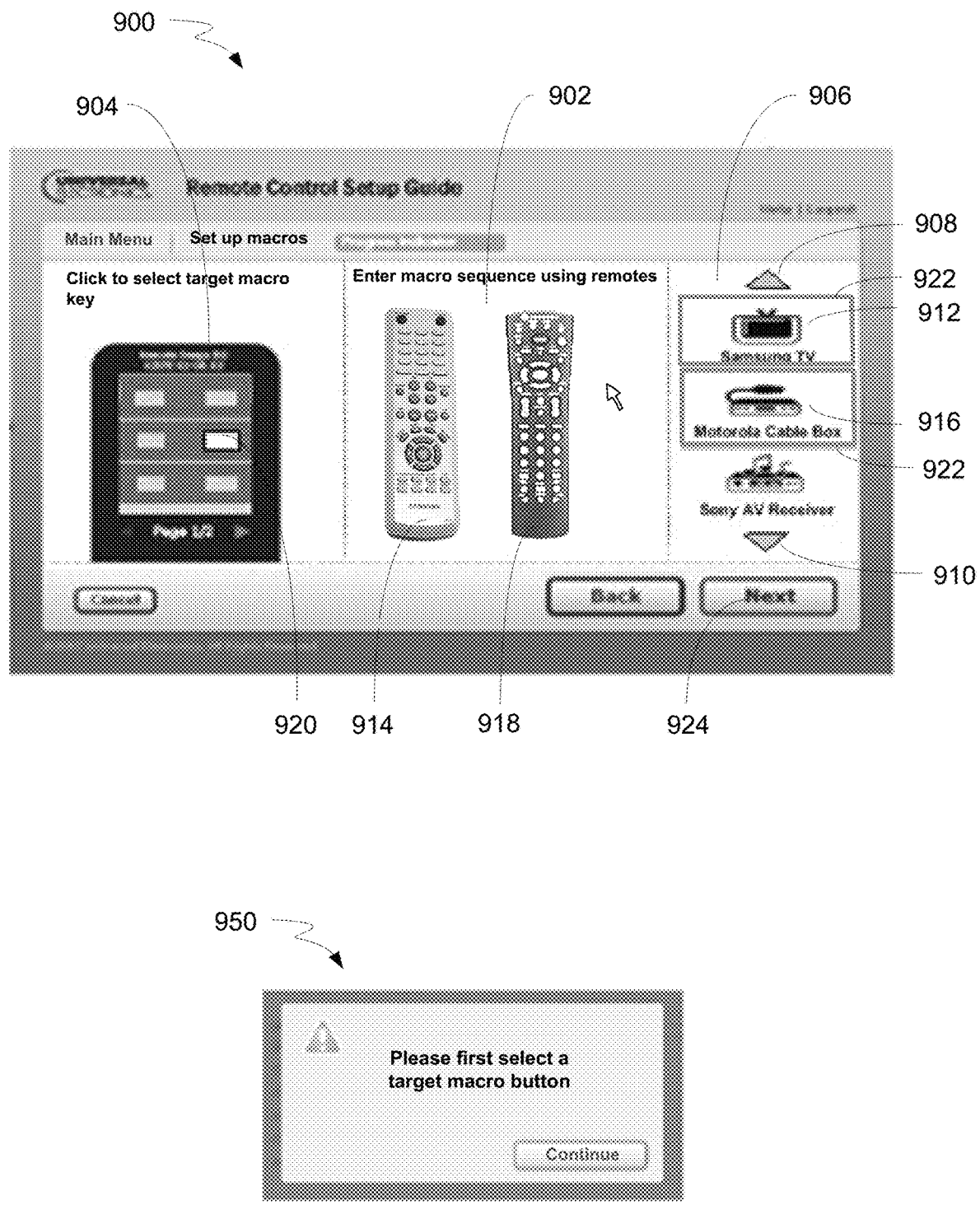
FIG. 9 illustrates portions of an exemplary user interface used in conjunction with the method illustrated in FIG. 8.

In a second exemplary embodiment illustrated in FIGS. 8 and 9, as an alternate to drag and drop programming of macro command sequences a user may be presented with simultaneous images of multiple original equipment remote controls and may directly designate macro command sequences for assignment to one or more macro icons by sequentially actuating buttons representing commands to be programmed onto a pre-selected macro icon, as will now be described.

Commencing at steps 800 and 802, an exemplary configuration application user interface 900 may display an image 904 of the macro command icons (or buttons, as appropriate) available on controlling device 100, together with a list 906 of configured target appliances. If the list of target appliances is longer than can be displayed in the space available, clickable icons 908,910 may be provided to scroll through the list. Initially, the display area 902 set aside for images representative of original equipment remote controls may be blank, ready to be populated by the user as described hereafter. Thereafter, at step 804 the exemplary configuration application may wait for user input as described previously.

If a received user input is determined at step 806 to be selection of macro function as a programming target, for example a mouse click on macro icon 920, at step 808 any previously selected macro icon is deselected, and thereafter at step 810 the indicated macro icon is set as the current programming target. As an indication of its current state, the displayed representation of the selected macro icon may be altered, for example emphasized as illustrated at 920, magnified, made blinking, color changed, etc. Thereafter, the exemplary configuration application may resume waiting for user input.

If a received user input is determined at step 812 to be selection of a configured device to be a source of command functions, for example a mouse click on TV icon 912, then if that device is not already selected, at step 816 the device is selected, its icon emphasized, for example surrounded by a window 922 as illustrated, or otherwise highlighted, magnified, etc., and an image of the original equipment remote control applicable to that selected device is retrieved as described previously and displayed in display area 920, for example as illustrated at 914. If however it was determined at step 814 that the user input was with respect to a device which is already in the selected state, this is interpreted as a request to deselect that device and at step 818 the device is deselected, its icon emphasis removed, and the image of its original equipment remote control removed from display area 902. In this manner, users may populate display area 902 with remote control images of their choice, for example remote control 914 corresponding to configured device 912, remote control 918 corresponding to configured device 916, etc.

If a received user input is determined at step 820 to be a request to scroll configured device list 906, e.g., activation of one of the scroll icons 908,910, at step 822 the displayed listing of configured devices is scrolled in the appropriate direction, whereafter the exemplary configuration application may resume waiting for user input.

If a received user input is determined at step 824 to be activation of one of the buttons of a displayed original equipment remote control, at step 830 the command function corresponding to the activated button is entered into the currently being edited/created macro command sequence for the selected macro icon. If at step 826 it is determined that no macro is currently selected as a programming target, an error message is displayed at step 828, for example as illustrated at 950, whereafter the exemplary configuration application may resume waiting for user input.

Finally, if a received user input is determined at step 824 to be activation of the "Next" icon 924, then at step 836 the macro command sequence(s) tabulated during the present programming session are saved into the controlling device configuration being edited and at step 838 the configuration application returns to main menu display 500. It will be noted that the operation of the "Back" and "Cancel" icons are as previously described in conjunction with FIG. 6, and as such for the sake of brevity those descriptions will not be repeated here.

In the manner described above a user may select a macro icon to be programmed, may select one or more configured appliances to be the target for commands to be transmitted via a macro command sequence, and may define the desired command sequence by activating a series of buttons on the displayed images of original equipment remote controls.

While various concepts have been described in detail, it will be appreciated by those skilled in the art that various modifications and alternatives to those concepts could be developed in light of the overall teachings of the disclosure. For example, in an alternate embodiment, a user may activate buttons of one or more displayed OEM remote controls to create a macro command sequence and thereafter assign the created macro command sequence to a macro icon and, as such, it will be appreciated that the steps described above and illustrated in the figures need not be performed in any particular order. In such an embodiment (or in the embodiments described above) as a user selects buttons of the displayed OEM remote control(s), it will be understood that a listing of the commands selected by a user for placement into a macro command sequence can be displayed to the user to thereby allow the user to see the current state of the macro command sequence prior to (or during) its assignment to a macro icon. Furthermore, although presented in an illustrative embodiment as a standalone remote control, it will be understood that the functionality associated with controlling device 100 may be implemented as an optional or integral feature of another portable device, such as for example a PDA, cellular phone, etc. Still further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A non-transitory, computer readable media having stored thereon instructions for creating a macro command sequence for use by a configurable control device, the instructions, when executed by a processing device, performing steps comprising:
   causing an exact image of an original equipment manufacturer remote control device that is provided with a target device to be displayed in a display device, where the exact image of the original equipment manufacturer remote control device includes images of buttons of the original equipment manufacturer remote control device that would be used to control controllable functions of the target device;
   accepting a first input by which a one or more of the displayed images of buttons of the original equipment manufacturer remote control device are selected; and
   using the selection of the one or more displayed images of buttons of the original equipment manufacturer remote control device to select a one or more commands for assignment to a macro command icon or macro command button of the configurable controlling device as the macro command sequence.

2. The non-transitory, computer readable media as recited in claim 1, wherein the configurable controlling device comprises plural macro command icons or macro command buttons and wherein the instructions, when executed by the processing device, cause an image of each of the plural macro command icons or macro command buttons to be displayed in the display device and cause a second input to be accepted to select an image of a one of the plural macro command icons or macro command buttons to which the one or more commands are to be assigned.

3. The non-transitory, computer readable media as recited in claim 2, wherein the first input and the second input comprises a drag and drop operation.

4. The non-transitory, computer readable media as recited in claim 2, wherein the instructions, when executed by the processing device, cause a change in an appearance of the image of the one of the plural macro command icons or macro command buttons in response to being selected via the second input.

5. The non-transitory, computer readable media as recited in claim 1, wherein the display device comprises a display of the controlling device.

6. The non-transitory, computer readable media as recited in claim 1, wherein the display device comprises a display of a computing device adapted to communicate with the controlling device.

7. The non-transitory, computer readable media as recited in claim 1, wherein the instructions, when executed by the processing device, cause an image of each of a plurality of target devices to be displayed in the display device, cause a second input to be accepted by which an image of a one of the of the plurality of target devices is selected; and cause the exact image of an original equipment manufacturer remote control device that is provided with the target device to be displayed in a display device in response to the second input.

8. A method for creating a macro command sequence for use by a configurable control device, comprising:
   causing an exact image of an original equipment manufacturer remote control device that is provided with a target device to be displayed in a display device, where the exact image of the original equipment manufacturer remote control device includes images of buttons of the original equipment manufacturer remote control device that would be used to control controllable functions of the target device; and
   using a selection of one or more of the displayed images of buttons of the original equipment manufacturer remote control device to select a one or more commands for assignment to a macro command icon or macro command button of the configurable controlling device as the macro command sequence.

9. The method as recited in claim 8, wherein the configurable controlling device comprises plural macro command icons or macro command buttons and the method further comprises causing an image of each of the plural macro command icons or macro command buttons to be displayed in the display device and using a second input to select an image of a one of the plural macro command icons or macro command buttons to which the one or more commands are to be assigned.

10. The method as recited in claim 9, wherein the first input and the second input comprises a drag and drop operation.

11. The method as recited in claim 9, further comprising causing a change in an appearance of the image of the one of the plural macro command icons or macro command buttons in response to being selected via the second input.

12. The method as recited in claim 8, wherein the display device comprises a display of the controlling device.

13. The method as recited in claim 8, wherein the display device comprises a display of a computing device adapted to communicate with the controlling device.

14. The method as recited in claim 8, further comprising causing an image of each of a plurality of target devices to be displayed in the display device and using a second input by which an image of a one of the of the plurality of target devices is selected to cause the exact image of an original equipment manufacturer remote control device that is provided with the target device to be displayed in a display device.

* * * * *